United States Patent
Koch et al.

(10) Patent No.: US 8,882,393 B2
(45) Date of Patent: Nov. 11, 2014

(54) TOOL FOR LONGITUDINALLY SUBDIVIDING SEWER PIPES

(75) Inventors: Elmar Koch, Eslohe (DE); Martin Köper, Attendorn (DE); Michael Heimes, Lennestadt (DE); Sebastian Schwarzer, Meschede (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 294 days.

(21) Appl. No.: 12/936,958

(22) PCT Filed: Apr. 2, 2009

(86) PCT No.: PCT/EP2009/002417
§ 371 (c)(1),
(2), (4) Date: Dec. 21, 2010

(87) PCT Pub. No.: WO2009/124690
PCT Pub. Date: Oct. 15, 2009

(65) Prior Publication Data
US 2011/0150577 A1   Jun. 23, 2011

(30) Foreign Application Priority Data
Apr. 10, 2008   (DE) .......................... 10 2008 018 150

(51) Int. Cl.
*F16L 55/18* (2006.01)
*F16L 55/165* (2006.01)
*E21B 29/00* (2006.01)
*E21B 7/20* (2006.01)
*B23D 21/02* (2006.01)

(52) U.S. Cl.
CPC ............. *F16L 55/1658* (2013.01); *E21B 29/00* (2013.01); *E21B 7/205* (2013.01); *B23D 21/02* (2013.01)
USPC ...................... 405/184.3; 405/184; 405/184.1; 405/156; 138/97; 166/55.2; 30/92.5

(58) Field of Classification Search
CPC .................................................... F16L 55/1658
USPC ................ 405/156, 184, 184.1, 184.2, 184.3; 138/97; 166/55.2; 30/92.5
See application file for complete search history.

(56) References Cited

U.S. PATENT DOCUMENTS

| 5,078,546 | A | 1/1992 | Fisk et al. |
| 5,544,977 | A * | 8/1996 | Cravy et al. ................. 405/184.3 |
| 6,213,210 | B1 * | 4/2001 | Hailey .......................... 166/277 |
| 6,340,270 | B2 * | 1/2002 | Puttmann ................... 405/184.3 |
| 6,896,077 | B1 | 5/2005 | Gunsaulis et al. |

(Continued)

FOREIGN PATENT DOCUMENTS

| DE | 38 15 232 C1 | 1/1989 |
| DE | 103 57 061 | 7/2005 |
| DE | 10 2004 057 789 | 6/2006 |
| WO | WO 02/29304 | 4/2002 |

*Primary Examiner* — Frederick L Lagman
*Assistant Examiner* — Carib Oquendo
(74) *Attorney, Agent, or Firm* — Howard IP Law Group, PC

(57) ABSTRACT

The invention relates to a tool for longitudinally subdividing buried sewer pipes having an asymmetric, generally oval cross section, made substantially of a support shoe opposing a cutting blade acting in the direction of the pipe axis. The device also has two side cutting blades and is moved through the old pipe by means of a rod and a cylindrical calibration mandrel.

13 Claims, 4 Drawing Sheets

(56) References Cited

U.S. PATENT DOCUMENTS

| | | |
|---|---|---|
| 7,172,370 B2 | 2/2007 | Schmidt |
| 7,578,636 B2 * | 8/2009 | Tjader ........................ 405/184.3 |
| 7,698,974 B2 * | 4/2010 | Tjader .............................. 83/13 |
| 2003/0084764 A1 | 5/2003 | Wentworth |

* cited by examiner

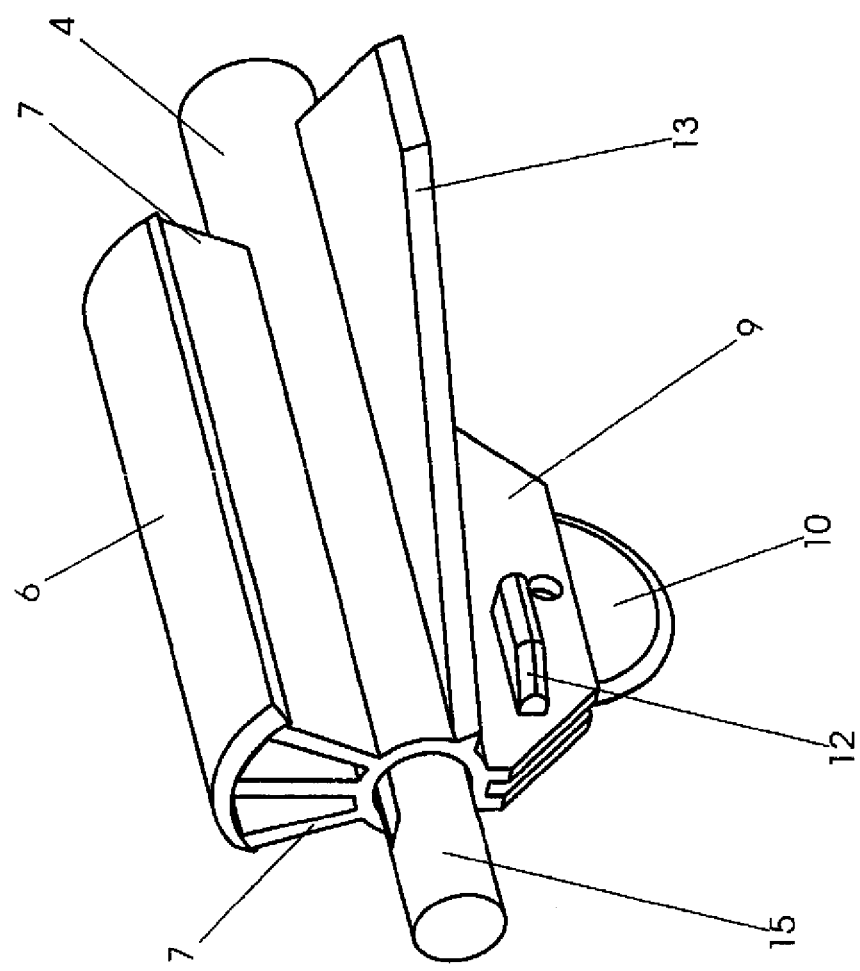

TOOL FOR LONGITUDINALLY SUBDIVIDING SEWER PIPES

CROSS-REFERENCES TO RELATED APPLICATIONS

This application is the U.S. National Stage of International Application No. PCT/EP2009/002417, filed Apr. 2, 2009, which designated the United States and has been published as International Publication No. WO 2009/124690 and which claims the priority of German Patent Application, Serial No. 10 2008 018 150.1, filed Apr. 10, 2008, pursuant to 35 U.S.C. 119(a)-(d).

BACKGROUND OF THE INVENTION

The invention relates to a tool for longitudinally subdividing underground sewer pipes having asymmetric, namely oval cross section.

Such pipes do not permit the use of common equipments for trenchless replacement or installation of underground lines because these, without exception, require pipelines with circular walls and thus are intended only for destruction of axially symmetrical old lines.

There is, however, a great need for devices that are applicable in a same way for oval pipes to allow trenchless replacement while using the given pipe course.

SUMMARY OF THE INVENTION

The invention is thus based on the problem to provide a device for destructive replacement of sewer pipes while taking into account the asymmetry of an oval pipe.

This object is solved by a tool including a support shoe which is opposed by a cutting blade for severing a pipe wall as well as two side cutting blades to subdivide the pipe wall in a same direction. The support shoe ensures hereby that the old pipe gradient is maintained for the introduced new pipe even when the old pipe is slightly widened in its lower area after undergoing the longitudinal subdivision. In this way, later deposits from sewage water can be avoided in the new pipe.

The single blades and the support shoe are preferably arranged substantially in the form of a star on the casing of a tubular support. The cutting blade, preferably a cutting roller, in opposition to the support shoe should, however, be arranged anteriorly of the side cutting blades in operating direction. The preferably large-area support shoe absorbs the reactive forces of the opposing cutting blade, without destroying the old pipe. The side cutting blades become effective only later or after the cutting roller in order to cut longitudinal strips from the pipe that has been slit in the base.

In order to be able to longitudinally subdivide pipes of different diameters, the cutting roller may be radially adjustable and arranged centrally between two side cutting blades or cutting knives which are also radially adjustable and preferably offset rearwardly slightly in opposition to the operating direction.

In order to be able to laterally guide the cutting blade, guide pieces may be arranged on the tool on both sides of the cutting roller and supported on the pipe wall. Furthermore, the tool may be rotatably arranged on the support.

Overall, the tool according to the invention affords a fairly simple possibility to longitudinally subdivide an oval pipe in a meaningful way and to slightly widen it hereby in order to install coaxially a new pipe without damage.

BRIEF DESCRIPTION OF THE DRAWING

An exemplary embodiment of the invention will now be described in greater detail with reference to the drawing, in which:

FIG. 4 shows the tool of FIG. 3 with a rod section.

DETAILED DESCRIPTION OF PREFERRED EMBODIMENTS

Figure 1:
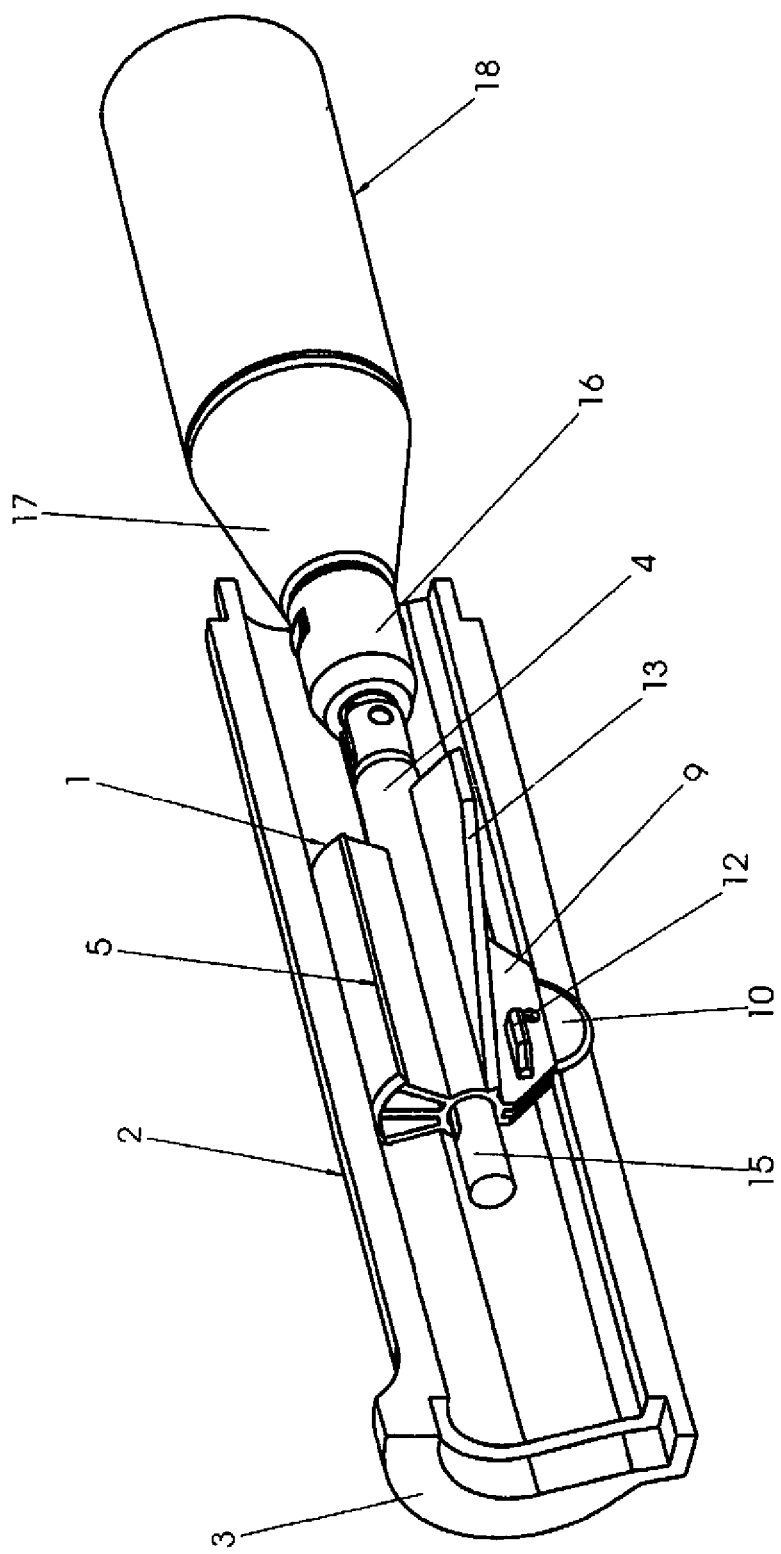
FIG. 1 shows a side perspective view of a tool according to the invention in an old pipe cut in longitudinal direction.
Figure 2:
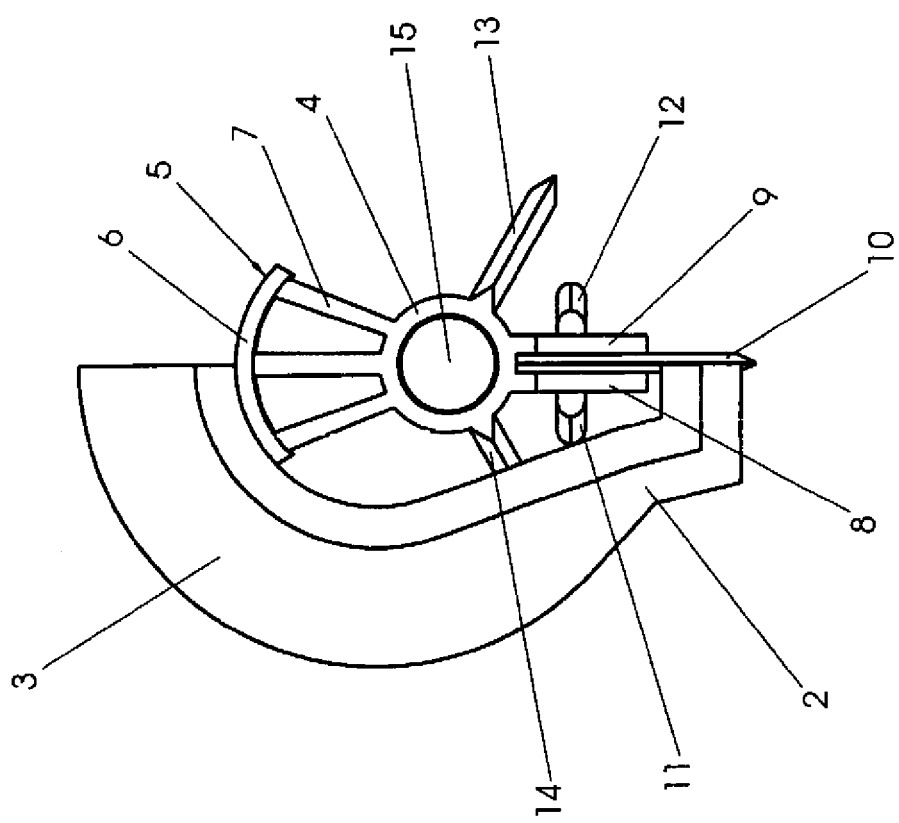
FIG. 2 shows a cross section through the device of FIG. 1 in the old pipe.

The tool 1 is shown in its operative position in a substantially oval sewer pipe 2 with a pipe socket 3; it includes essentially a tubular support 4 with an upwardly pointing support shoe 5 in the configuration of a part-circular shaped shell 6 that is conformed to the curvature of the pipe wall and is connected to the support pipe 4 via struts 7 arranged in star shape. The support shoe 5 is opposed by a cutting roller 10 which is arranged between two parallel radial plates 8, 9 of the support pipe 4 and sized to project beyond the old pipe 2 in radial direction.

Arranged on each of the plates 8, 9 is furthermore a guide piece 11, 12 which is supported on the wall of the old pipe 2. Finally, the support pipe 4 is provided on both sides in opposition to one another with wedge-shaped cutting knifes 13, 14 which are however arranged offset to the rear in relation to the cutting roller 10.

Figure 3:
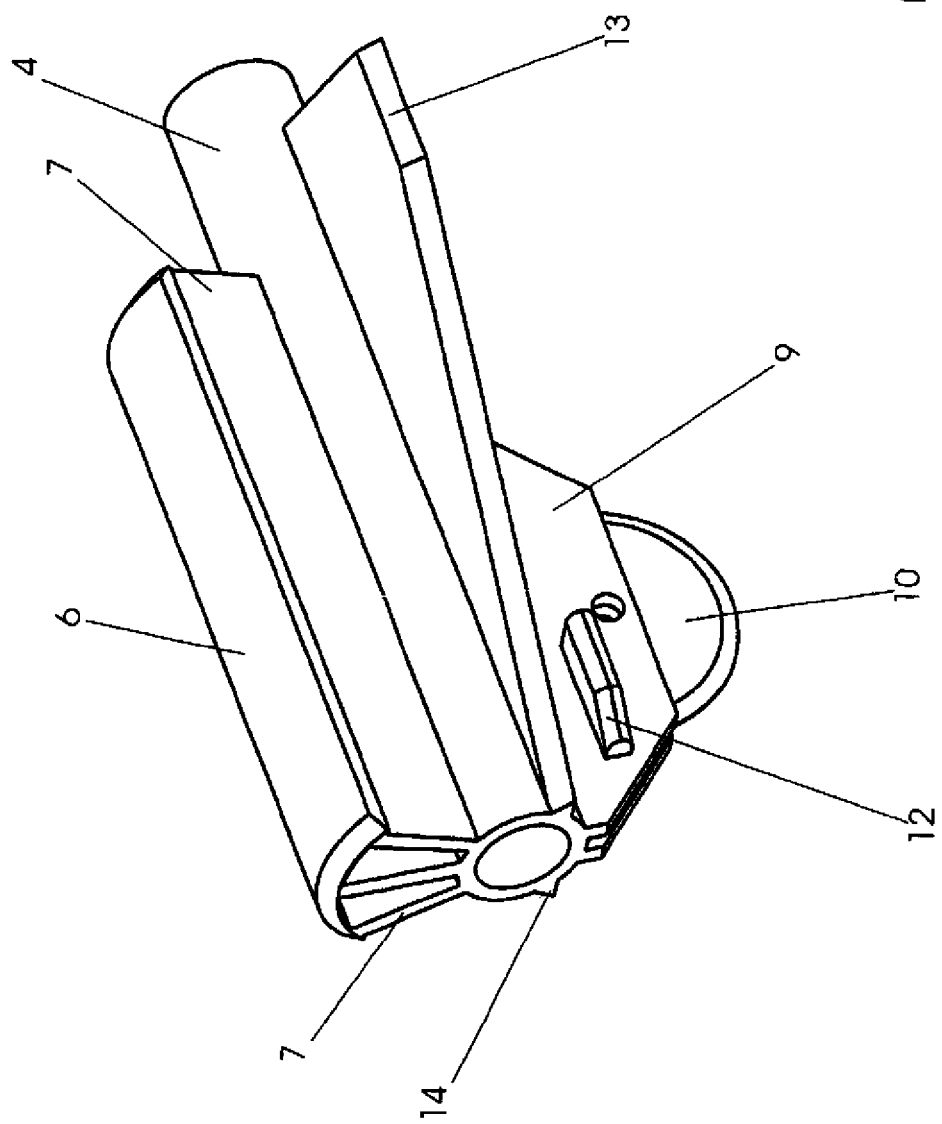
FIG. 3 shows the perspective view of the tool according to FIGS. 1 and 2.

The support shoe 5 ensures jointly with the two side guide pieces 11, 12 and the rotatable arrangement of the tool comprised of support pipe 4, support shoe 5, radial plates 8, 9 on a bursting rod 15 that the tool 1 retains its position regardless of any possible rotation of the rod 15. As a result, the tool uses the path that is determined by the guide pieces 11, 12 and oriented on the pipe axis so that the cut implemented by the cutting roller 10 is located at all times in the base of the pipe 2. FIG. 3 shows the tool 1 without bursting rod, whereas in FIG. 4, the rod 15 extends through the support pipe 4 of the tool 1.

The bursting rod 15 is connected via a coupling sleeve 16 with the conical expansion nose 17 of a calibration mandrel 18 which has an interior in which the unillustrated new pipe extends.

Overall, a relatively uncomplicated longitudinal dividing of the old pipe is realized as well as an expansion involving a substantial U-shaped longitudinal dividing of the old pipe 2, and sideways pushing of longitudinal strips on both sides of the cutting roller 10 as a result of the conical expansion nose 17.

What is claimed is:

1. A tool for longitudinally subdividing an underground sewer pipe of asymmetrical cross section, comprising:
    a tubular support including an annular wall defining an opening;
    a support shoe arranged on the tubular support, the support shoe shaped as a circle sector and configured to conform to and rest against a curved inside of an old pipe, opposite a sole of the old pipe;
    a first cutting blade arranged on the tubular support in opposition to the support shoe for cutting the sole of the old pipe; and
    two second side cutting blades arranged on the tubular support at a distance to the first cutting blade.

2. The tool of claim 1, wherein the support shoe and the first and second cutting blades are arranged on the tubular support in the form of a star.

3. The tool of claim 1, wherein the first cutting blade is a cutting roller.

4. The tool of claim 1, wherein the second cutting blades are arranged in axial offset relationship to the first cutting blade.

5. The tool of claim 1, wherein the first cutting blade and the second cutting blades are mounted for radial displacement.

6. The tool of claim 1, further comprising lateral guide pieces arranged on both sides of the first cutting blade.

7. The tool of claim 1, wherein the first cutting blade is arranged anteriorly of the second cutting blades in operative direction.

8. The tool of claim 7, wherein the first cutting blade is arranged centrally between the second cutting blades.

9. The tool of claim 1, wherein a diameter of the opening of the tubular support is sufficiently large to receive a rod of a propulsion device.

10. The tool of claim 9, wherein the tool is rotatably arranged on the rod.

11. The tool of claim 9, wherein the propulsion device includes a driven calibration mandrel with a conical nose.

12. The tool of claim 11, wherein a new pipe is arranged in the calibration mandrel.

13. The tool of claim 1, wherein the annular wall is configured to define the opening as an elongated axial passage, and wherein the support shoe, the first cutting blade, and the two second cutting blades extend radially outward from the axial passage.

* * * * *